(12) United States Patent
Makino

(10) Patent No.: US 8,070,129 B2
(45) Date of Patent: Dec. 6, 2011

(54) SOLENOID VALVE

(75) Inventor: Tadaaki Makino, Nukata-gun (JP)

(73) Assignee: Denso Corporation, Kariya (JP)

( * ) Notice: Subject to any disclaimer, the term of this patent is extended or adjusted under 35 U.S.C. 154(b) by 630 days.

(21) Appl. No.: 12/209,574

(22) Filed: Sep. 12, 2008

(65) Prior Publication Data

US 2009/0072174 A1 Mar. 19, 2009

(30) Foreign Application Priority Data

Sep. 14, 2007 (JP) ................................. 2007-239110

(51) Int. Cl.
*F16K 31/02* (2006.01)
(52) U.S. Cl. ................................................ 251/129.15
(58) Field of Classification Search ............. 251/129.01, 251/129.15
See application file for complete search history.

(56) References Cited

U.S. PATENT DOCUMENTS

| | | | |
|---|---|---|---|
| 4,905,961 A * | 3/1990 | Ichihashi et al. ......... | 251/129.15 |
| 6,669,166 B2 | 12/2003 | Enomoto et al. | |
| 6,752,374 B2 | 6/2004 | Miyamoto et al. | |
| 7,114,472 B2 * | 10/2006 | Kondo ........................ | 123/90.17 |
| 2005/0035321 A1 * | 2/2005 | Uemura et al. ........... | 251/129.03 |
| 2005/0077493 A1 * | 4/2005 | Okada ........................ | 251/129.15 |
| 2005/0098211 A1 * | 5/2005 | Ichinose et al. .................. | 137/82 |
| 2005/0217740 A1 * | 10/2005 | Segi et al. ................ | 137/625.65 |
| 2006/0218953 A1 * | 10/2006 | Hirota .......................... | 62/228.5 |
| 2007/0001139 A1 * | 1/2007 | Fleischer et al. ......... | 251/129.15 |
| 2007/0145315 A1 * | 6/2007 | Uemura et al. .................. | 251/84 |

FOREIGN PATENT DOCUMENTS

| | | |
|---|---|---|
| JP | 60-011790 | 1/1985 |
| JP | 04-181077 | 6/1992 |
| JP | 04-078375 | 7/1992 |
| JP | 07-317942 | 12/1995 |
| JP | 09-152055 | 6/1997 |
| JP | 2000-337542 | 12/2000 |
| JP | 2002-206659 | 7/2002 |

OTHER PUBLICATIONS

Japanese Office Action dated Jul. 14, 2009, issued in corresponding Japanese Application No. 2007-239110, with English translation.
Chinese Office Action dated Sep. 14, 2010, issued in corresponding Chinese Application No. 200810212766.0, with English translation.
Chinese Office Action dated Jan. 22, 2010, issued in corresponding Chinese Application No. 200810212766.0, with English translation.

* cited by examiner

*Primary Examiner* — John Fristoe, Jr.
*Assistant Examiner* — Marina Tietjen
(74) *Attorney, Agent, or Firm* — Nixon & Vanderhye PC

(57) ABSTRACT

A solenoid valve includes a coil, a yoke, a tubular stator housing, an armature, a valve element, a tubular valve body, and a supporting member. The valve element is displaceable with the armature for opening and closing a flow channel. The tubular valve body is provided inside the stator housing for slidably supporting the valve element. The supporting member is coupled with the stator housing. The valve body includes a flange portion that extends radially outwardly. The flange portion is provided between the stator housing and the supporting member along a longitudinal axis of the valve body. The yoke is coupled with the stator housing.

12 Claims, 3 Drawing Sheets

SOLENOID VALVE

CROSS REFERENCE TO RELATED APPLICATION

This application is based on and incorporates herein by reference Japanese Patent Application No. 2007-239110 filed on Sep. 14, 2007.

BACKGROUND OF THE INVENTION

1. Field of the Invention

The present invention relates to a solenoid valve for controlling a flow amount of fluid.

2. Description of Related Art

The above type of a solenoid valve includes a valve portion and a solenoid portion. The valve portion includes a valve element that is slidably received in a tubular valve body, and a position of the valve element is controlled by a balance between an electromagnetic force and a spring force for opening and closing a flow channel. The solenoid portion drives the valve element by generating the electromagnetic force. The valve body of the valve portion is received in the solenoid portion, and a component of the solenoid portion is crimped such that the valve portion and the solenoid portion are integrated (see, for example, JP-A-2002-39420 corresponding to U.S. Pat. No. 6,669,166, JP-A-2003-106471 corresponding to U.S. Pat. No. 6,752,374).

However, in the above conventional solenoid valve, when the component of the solenoid portion is crimped, a load in a radial direction is applied to the valve body. As a result, a slide part of the valve body, which slide part slides with the valve element, may be deformed, and thereby the valve element may abnormally contact the slide part of the valve body disadvantageously. Also, the slide failure of the valve element may occur disadvantageously.

Alternatively, the valve body may be press fitted into the component of the solenoid portion to integrate the valve portion with the solenoid portion. However, in the above alternative case, the load in the radial direction is also applied to the valve body, and thereby the disadvantages similar to the above may occur.

SUMMARY OF THE INVENTION

The present invention is made in view of the above disadvantages. Thus, it is an objective of the present invention to address at least one of the above disadvantages.

To achieve the objective of the present invention, there is provided a solenoid valve, which includes a coil, a yoke, a tubular stator housing, an armature, a valve element, a tubular valve body, and a supporting member. The coil is configured to form a magnetic field when the coil is energized. The yoke receives the coil to form a magnetic circuit. The tubular stator housing is provided on an inner peripheral side of the coil for forming the magnetic circuit. The armature is attracted in one direction when the coil is energized. The valve element is displaceable with the armature for opening and closing a flow channel. The tubular valve body is provided inside the stator housing for slidably supporting the valve element. The supporting member is coupled with the stator housing. The valve body includes a flange portion that extends radially outwardly. The flange portion is provided between the stator housing and the supporting member along a longitudinal axis of the valve body. The yoke is coupled with the stator housing.

To achieve the objective of the present invention, there is also provided a solenoid valve, which includes a coil, a yoke, a tubular stator housing, an armature, a valve element, a tubular valve body, and a bearing. The coil is configured to form a magnetic field when the coil is energized. The yoke receives the coil to form a magnetic circuit. The tubular stator housing is provided on an inner peripheral side of the coil for forming the magnetic circuit. The armature is attracted in one direction when the coil is energized. The valve element is displaceable with the armature for opening and closing a flow channel. The tubular valve body is provided in the stator housing for slidably supporting the valve element. The bearing is provided in the valve body for slidably supporting the armature. The valve body has a first portion, on which the valve element is slidable, and the first portion has a diameter of D1. The valve body has a second portion, on which the bearing is mounted, and the second portion has a diameter of D2. $D1 \leq D2$.

BRIEF DESCRIPTION OF THE DRAWINGS

The invention, together with additional objectives, features and advantages thereof will be best understood from the following description, the appended claims and the accompanying drawings in which:

DETAILED DESCRIPTION OF PREFERRED EMBODIMENTS

First Embodiment

A solenoid valve according to the first embodiment of the present invention will be described with reference to FIG. 1.

Figure 1:
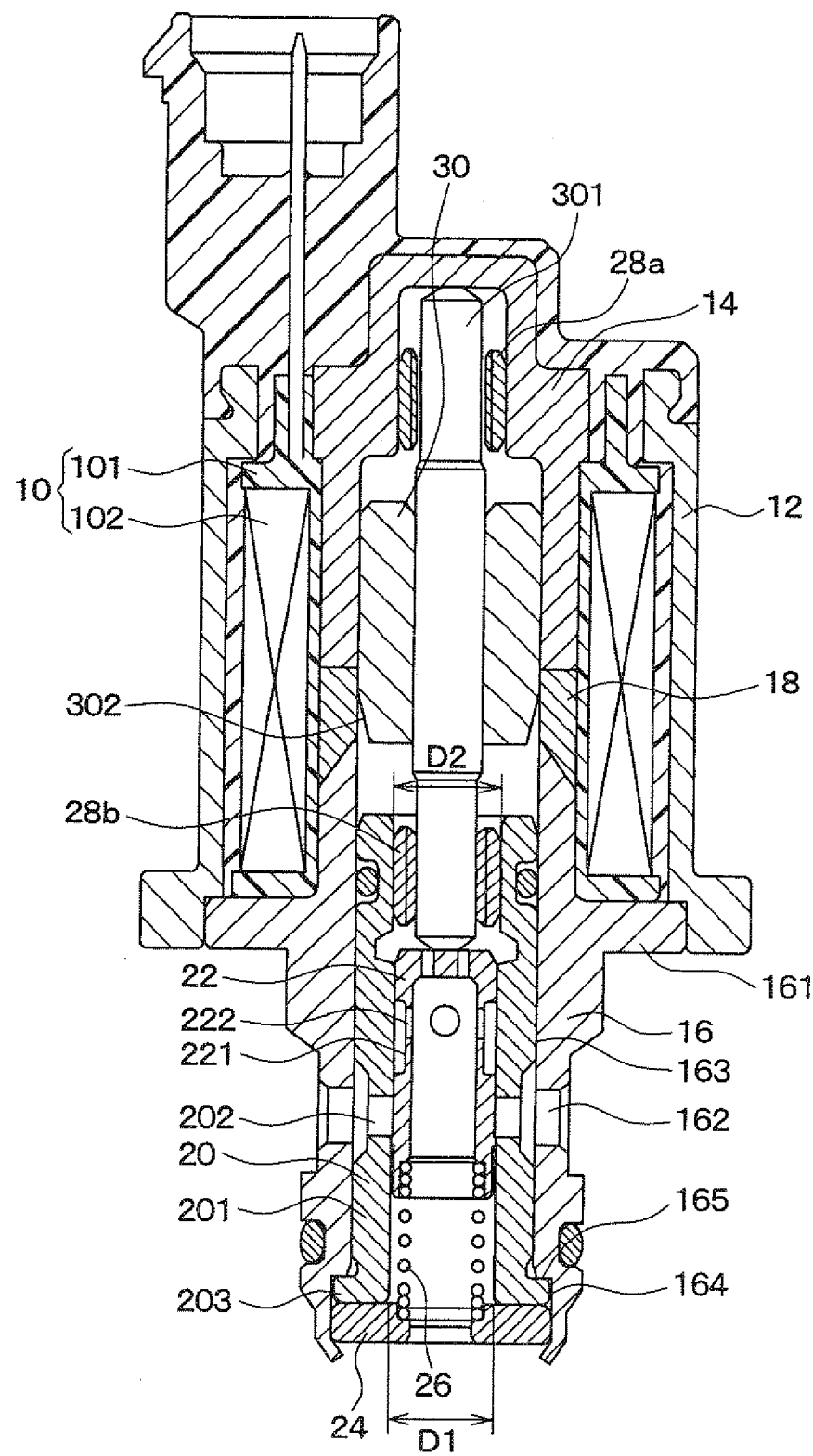
FIG. 1 is a cross sectional view of a solenoid valve according to a first embodiment of the present invention.

As shown in FIG. 1, the solenoid valve includes a coil 10. The coil 10 forms a magnetic field when the coil 10 is energized. The coil 10 is made by winding a coil wire 102 around a bobbin 101, which is made of a resin and has a flanged hollow cylindrical shape.

The coil 10 is received by a cylindrical yoke 12. The yoke 12 is made of a soft magnetic material and forms a magnetic circuit when the coil 10 is energized. For example, the above soft magnetic material may be an electromagnetic stainless steel (ferritic stainless steel SUS13).

A cylindrical stator housing 16 and a cylindrical stator core 14 having a bottom are provided on an inner peripheral side of the coil 10. The stator core 14 and the stator housing 16 are made of a soft magnetic material and form the magnetic circuit when the coil 10 is energized. For example, the above soft magnetic material may be an electromagnetic stainless steel (ferritic stainless steel SUS13). Also, the stator core 14 is coupled with the stator housing 16 via a cylindrical insertion member 18 through laser welding. In the above, the cylindrical insertion member 18 is made of a non-magnetic material (for example, austenitic stainless steel SUS304).

The stator housing 16 includes an annular stator flange portion 161 on an outer peripheral surface of the stator housing 16, and the stator flange portion 161 radially outwardly extends. The stator flange portion 161 is press fitted into an opening end portion of the yoke 12 such that the yoke 12 is coupled with the stator housing 16. Also, the stator housing 16 has a stator through hole 162 that provides communication between an inner peripheral side of the stator housing 16 and an outer peripheral side of the stator housing 16.

There is provided a hollow cylindrical metal valve body 20 in the stator housing 16, and the valve body 20 slidably receives therein a hollow cylindrical metal valve element 22 that has a bottom. The valve element 22 has an outer peripheral surface, which defines thereon an annular groove to form a small-diameter portion 221, and the small-diameter portion 221 is provided with a valve element through hole 222 that provides communication between an inner peripheral side of the valve element 22 and an outer peripheral side of the valve element 22.

The valve body 20 has a tubular portion 201 that is provided with a valve body through hole 202, and the valve body through hole 202 provides communication between an inner peripheral side of the tubular portion 201 and an outer peripheral side of the tubular portion 201. The valve body through hole 202 is always communicated with the stator through hole 162. Also, the valve body through hole 202 has a slit shape that extends in a displacement direction of the valve element 22, in which direction the valve element 22 is displaceable. Thus, an opening area of the valve body through hole 202 is controlled by the displacement of the valve element 22, or in other words, a communication area between the valve body through hole 202 and the small-diameter portion 221 of the valve element 22 is controlled. As a result, an amount of the fluid flow is minutely adjustable. Note that, the valve body through hole 202 serves as a flow channel.

The tubular portion 201 of the valve body 20 has an end portion that is provided with an annular valve body flange portion 203, and the valve body flange portion 203 radially outwardly extends. The stator housing 16 includes a small-diameter bore 163, a large-diameter bore 164, and a step portion 165 that is provided between the small-diameter bore 163 and the large-diameter bore 164. The small-diameter bore 163 has a diameter smaller than a diameter of the large-diameter bore 164. The tubular portion 201 of the valve body 20 is received in the small-diameter bore 163 of the stator housing 16, and the valve body 20 has a valve body flange portion 203 that is received by the large-diameter bore 164 of the stator housing 16. More specifically, the valve body flange portion 203 has one longitudinal end surface, which contacts the step portion 165, and which end surface faces along a longitudinal axis of the valve body 20 toward the armature 30.

Also, the large-diameter bore 164 of the stator housing 16 receives therein an annular metal supporting member 24, and the supporting member 24 contacts the other longitudinal end surface of the valve body flange portion 203, which end surface faces along the longitudinal axis away from the armature 30.

Then, an opening end portion of the large-diameter bore 164 is crimped inwardly in a radial direction. As a result, the valve body 20 and the supporting member 24 are coupled with the stator housing 16 in a state, where the step portion 165 and the supporting member 24 are arranged such that the valve body flange portion 203 is provided between the step portion 165 and the supporting member 24 along the longitudinal axis.

In the above, the valve body 20 is fitted inside the stator housing 16 with a clearance between the valve body 20 and the stator housing 16. Specifically, there is formed a clearance of 10 to 40 μm between the tubular portion 201 of the valve body 20 and the small-diameter bore 163 of the stator housing 16. Even in a case, where the stator housing 16 is deformed when the stator flange portion 161 is press fitted into the yoke 12, the above clearance limits a load in the radial direction from being applied to the valve body 20, and thereby the valve body 20 is limited from being deformed.

Also, there is a first coupling portion between the supporting member 24 and the large-diameter bore 164 of the stator housing 16, and there is a second coupling portion between the yoke 12 and the stator flange portion 161. There is formed a slide portion between the valve element 22 and the valve body 20. In the above, the supporting member 24 is coupled with the large-diameter bore 164 of the stator housing 16 at the first coupling portion. Also, the yoke 12 is coupled with the stator flange portion 161 at the second coupling portion. The valve element 22 slides on the valve body 20 at the slide portion. In the above configuration, the slide portion is displaced from at least one of the first coupling portion and the second coupling portion along the longitudinal axis of the valve body 20.

In other words, the large-diameter bore 164 of the stator housing 16 has a first coupling surface that radially inwardly faces with an outer surface of the supporting member 24. The stator flange portion 161 has a second coupling surface that radially outwardly faces with an inner surface of the yoke 12. The valve element 22 has a slide surface that slides on an inner surface of the valve body 20. In the above definition, the slide surface of the valve element 22 is formed or provided at a longitudinal position different from a position of the first coupling surface of the stator housing 16 and from a position of the second coupling surface of the stator flange portion 161 along the longitudinal axis of the valve body 20.

There is provided a spring 26 between the supporting member 24 and the valve element 22, and the spring 26 always biases the valve element 22 in a valve closing direction for closing the valve or in a direction away from the supporting member 24.

There is provided a first bearing 28a in the stator core 14, and there is a second bearing 28b in the stator housing 16. A push rod 301 that is integral with an armature 30 is slidably supported by the bearings 28a, 28b.

The valve body 20 has a first portion, on which the valve element 22 is slidable, and the first portion has a diameter of D1. The valve body 20 has a second portion, on which the second bearing 28b is mounted, and the second portion has a diameter of D2. In the above, a relation of $D1 \leq D2$ is satisfied. When $D1 \leq D2$ is satisfied, a final polishing process of the valve element slide bore, where the valve element 22 slides on, is facilitated because a valve element slide bore is limited from having a diameter smaller at the entrance of the bore than the inside of the bore.

The armature 30 is made of a soft magnetic material (for example, pure iron), and is attracted toward the stator housing 16 (in other words, downwardly in FIG. 1) when the coil 10 is energized. The push rod 301 has one end surface that contacts an end surface of the valve element 22, which end face of the valve element 22 faces the push rod 301. As above, the valve element 22 is configured to be displaceable with, or mechanically slaved with, the displacement of the armature 30.

The armature 30 has a tapered portion 302 on a side of the armature 30 toward the valve element 22. The tapered portion 302 has an outer diameter that becomes smaller toward the end of the tapered portion 302 in a direction to the valve element 22, and thereby a cross sectional area of the tapered portion 302 becomes smaller accordingly. The displacement position of the armature 30 and the valve element 22 is determined by an amount of energization to the coil 10.

Specifically, when the coil 10 is deenergized, or in other words, when the solenoid valve is in a state shown in FIG. 1, the valve body through hole 202 is not communicated with the small-diameter portion 221 of the valve element 22. Thus, the valve body through hole 202 is closed by the valve element 22. In contrast, when the coil 10 is energized, the armature 30 is attracted toward the valve body 20 or the stator housing 16. As a result, the valve element 22 is displaced in a valve opening direction for opening the valve or is displaced toward the supporting member 24 against a bias force of the spring 26 such that the valve body through hole 202 is made communicated with the small-diameter portion 221 of the valve element 22. When the energization amount is increased, the opening area of the valve body through hole 202 is increased accordingly to the energization amount.

In the solenoid valve of the present embodiment, the valve body 20 and the supporting member 24 are fixed to the stator housing 16 in a state, where the step portion 165 of the stator housing 16 and the supporting member 24 are arranged such that the valve body flange portion 203 of the valve body 20 is provided between the step portion 165 of the stator housing 16 and the supporting member 24 along the longitudinal axis. As a result, the load in the radial direction is not applied to the valve body 20. Therefore, the slide portion of the valve body 20, which portion is slidable with the valve element 22, is limited from being deformed, and thereby the abnormal contact of the valve element 22 with the valve body 20 is limited. For example, one radial side of the valve element 22 may abnormally contact the valve body 20. Also, the slide failure of the valve element 22 is limited.

Also, the valve body 20 is fitted into or inside the stator housing 16 with a clearance between the valve body 20 and the stator housing 16. Thus, even in a case, where the stator housing 16 is deformed when the stator flange portion 161 is press fitted into the yoke 12, the clearance between the tubular portion 201 of the valve body 20 and the small-diameter bore 163 of the stator housing 16 limits the load in the radial direction from being applied to the valve body 20, and thereby the valve body 20 is limited from being deformed. As a result, the slide portion of the valve body 20, which portion slides on the valve element 22, is limited from being deformed. Thus, the abnormal contact of the valve element 22 with the valve body 20 and the slide failure of the valve element 22 are effectively limited.

Second Embodiment

Figure 2:
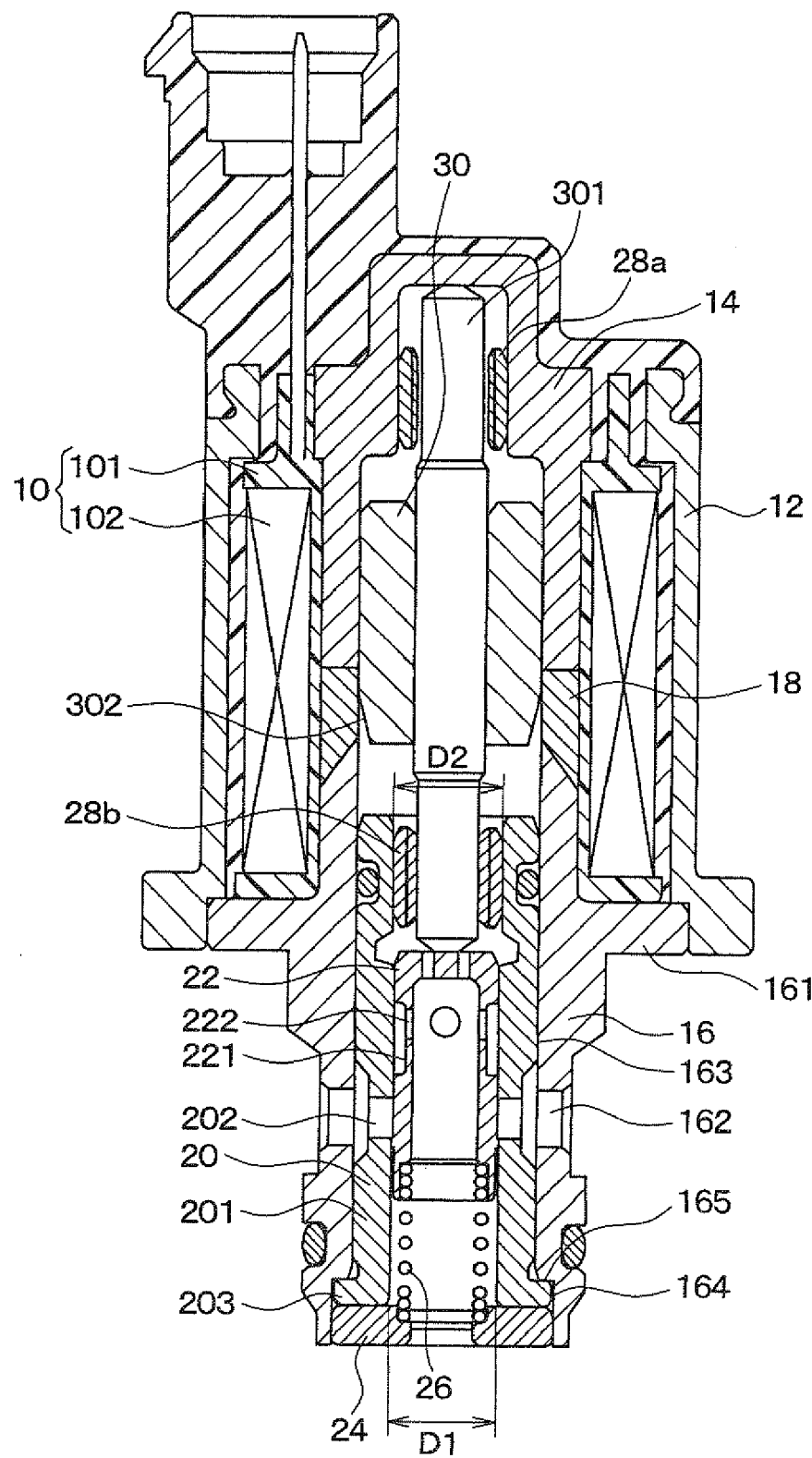
FIG. 2 is a cross sectional view of a solenoid valve according to a second embodiment of the present invention.

The second embodiment of the present invention will be described with reference to the accompanying drawing. FIG. 2 is a cross sectional view of a solenoid valve according to the second embodiment. Note that, similar components of the solenoid valve of the present embodiment, which are similar to the components of the solenoid valve of the first embodiment, will be indicated by the same numerals, and explanation thereof will be omitted.

The present embodiment is different from the first embodiment in a method for coupling the valve body 20 and the supporting member 24 with the stator housing 16. In other words, in the present embodiment, as shown in FIG. 2, the supporting member 24 is press fitted into the large-diameter bore 164 of the stator housing 16. Thus, the valve body 20 and the supporting member 24 are coupled with the stator housing 16 in a state, where the valve body flange portion 203 is provided between the step portion 165 and the supporting member 24 along the longitudinal axis.

In the above coupling method, the load in the radial direction is limited from being applied to the valve body 20. Thus, the slide portion of the valve body 20, which portion slides on the valve element 22, is limited from being deformed, and thereby the abnormal contact of the valve element 22 and the slide failure of the valve element 22 are effectively limited.

Third Embodiment

Figure 3:
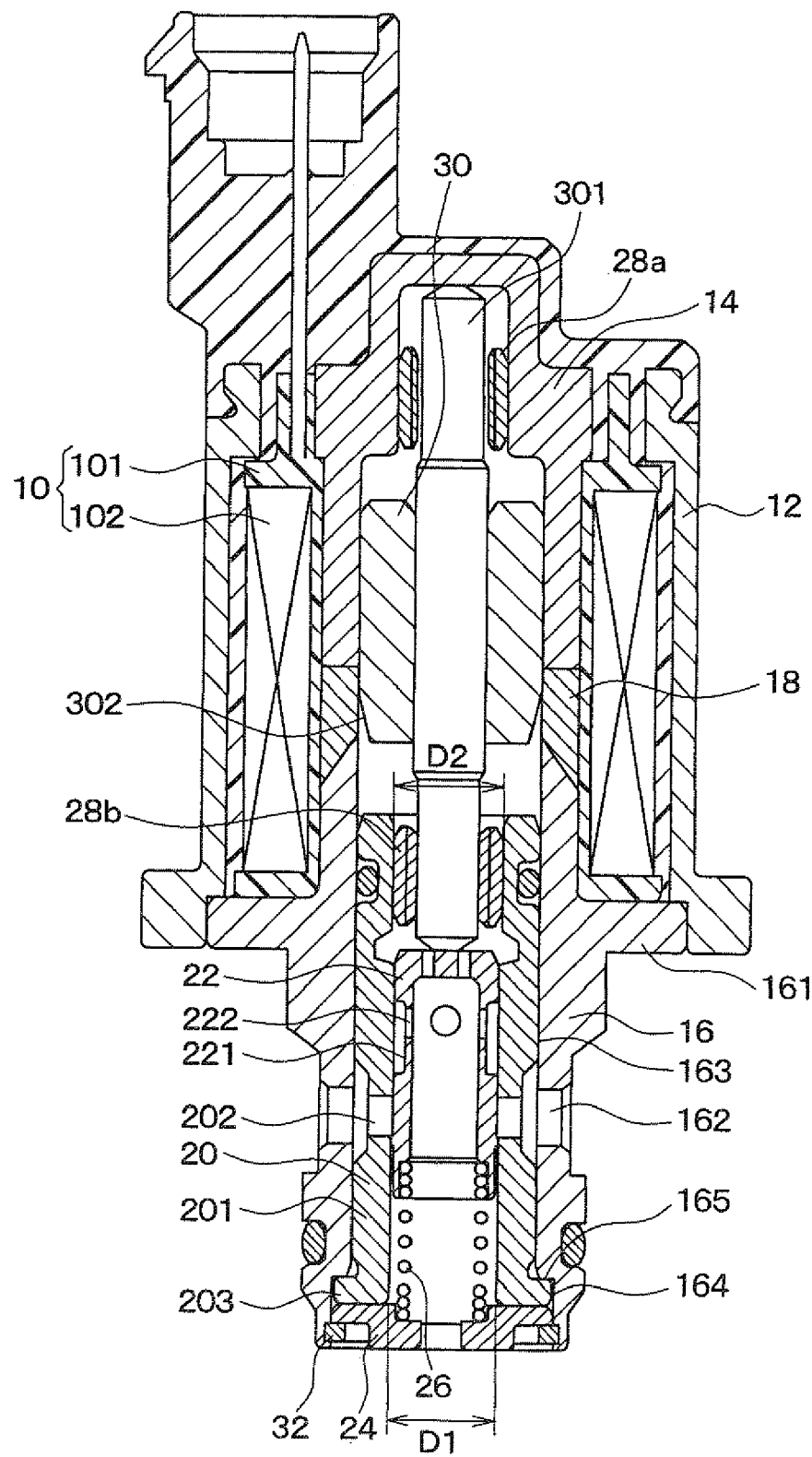
FIG. 3 is a cross sectional view of a solenoid valve according to a third embodiment of the present invention.

The third embodiment of the present invention will be described with reference to the accompanying drawing. FIG. 3 is a cross sectional view of a solenoid valve according to the third embodiment. Note that, similar components of the solenoid valve of the present embodiment, which are similar to the components of the solenoid valve of the first embodiment, will be indicated by the same numerals, and explanation thereof will be omitted.

The present embodiment is different from the first embodiment in a method for coupling the valve body 20 and the supporting member 24 with the stator housing 16. In other words, in the present embodiment, as shown in FIG. 3, there is provided a retaining ring 32 that is engaged with the large-diameter bore 164 of the stator housing 16. The retaining ring 32 fixes the supporting member 24 to the stator housing 16. The valve body 20 and the supporting member 24 are coupled with the stator housing 16 in a state, where the valve body flange portion 203 is provided between the step portion 165 and the supporting member 24 along the longitudinal axis. Note that, the retaining ring 32 may employ a known C-ring.

In the above coupling method, the load in the radial direction is limited from being applied to the valve body 20. Thus, the slide portion of the valve body 20, which portion slides on the valve element 22, is limited from being deformed, and thereby the abnormal contact and the slide failure of the valve element 22 are effectively limited.

Other Embodiment

The above embodiment describes, as an example, a normally-closed solenoid valve, in which the valve body through hole 202 is fully closed when the coil 10 is deenergized. However, the present invention may be applied to a normally-open solenoid valve, in which the valve body through hole 202 is fully opened when the coil 10 is deenergized.

Also, the above embodiment describes, as an example, a linear solenoid valve, in which the opening area of the valve body through hole 202 changes accordingly to the energization amount to the coil 10. However, the present invention may be alternatively applied to an ON/OFF solenoid valve, in which the valve element 22 is displaceable between an opening position and a closed position.

In the solenoid valve described in JP-A-2002-39420, a spring guide 68 (corresponding to the supporting member 24) is directly press fitted into a valve case 9 (corresponding to the valve body 20). As a result, there is a possibility that a foreign object during the press fitting may fall into the valve case 9 or in other words, the foreign object may fall into a slide portion of the valve element.

In contrast, in the above embodiments, when the supporting member 24 is crimped to the stator housing 16, the above foreign object during the press fitting is not present. As a result, the foreign object is limited from falling into the valve body 20.

Also, in the above embodiment, in the case, where the supporting member 24 is coupled with the stator housing 16 by the retaining ring 32, the foreign object during the press fitting is not present. As a result, the foreign object is limited from falling into the valve body 20.

Also, in the above embodiment, in the case, where the supporting member 24 is press fitted into the stator housing 16, the foreign object during the press fitting tends to be captured in a space between the flange portion 203 of the valve body 20 and the supporting member 24. Thus, the foreign object is limited from falling into the valve body 20.

The solenoid valve described in JP-A-2002-39420 will be described by using component names and numerals described in JP-A-2002-39420. The solenoid valve of JP-A-2002-39420 has a bush 77 and the valve case 9, which are separate from each other. The above separate configuration may be employed because of the following two reasons.

As a first reason, a valve element 63 in the valve case 9 has a slide portion that has a diameter larger than a diameter of a press fitting portion of a slide bearing 78 of the bush 77. In a case, where the bush 77 were integrated with the valve case 9, the valve element slide bore, where the valve element 63 slides on, would have a diameter smaller at the entrance of the bore than a diameter inside the bore, and thereby a final polishing process for polishing the valve element slide bore would be more difficult to conduct.

Also, as a second reason, in the solenoid valve of JP-A-2002-39420, a spring guide 68 is press fitted into the valve case 9. In the above configuration, the foreign object during the press fitting may fall into the valve case 9. Thus, it is required that a spring 66 and a valve element 63 be assembled after the spring guide 68 has been press fitted into the valve case 9, and after the spring guide 68 and the valve case 9 have been washed. However, if the bush 77 and the valve case 9 form a one-piece structure or are integrated with each other, the washing after the press fitting of the spring guide 68 is difficult to conduct. Otherwise, the washing has to be conducted after the assembly of the valve element 63, and thereby the washing is not sufficiently conducted.

In contrast, in the above embodiment, the relation of D1≦D2 is satisfied such that the disadvantages of the solenoid valve of JP-A-2002-39420 in the case, where the bush 77 is integrated with the valve case 9, are avoided, and the above embodiment does not require a conventional bush.

Additional advantages and modifications will readily occur to those skilled in the art. The invention in its broader terms is therefore not limited to the specific details, representative apparatus, and illustrative examples shown and described.

What is claimed is:

1. A solenoid valve comprising:
   a coil that is configured to form a magnetic field when the coil is energized;
   a yoke that receives the coil to form a magnetic circuit;
   a tubular stator housing that is provided on an inner peripheral side of the coil for forming the magnetic circuit, said stator housing extending axially outwardly, beyond the coil, continuously and integrally in an axial direction of the coil, to define an axially extending portion of the stator housing;
   an armature that is attracted in one direction when the coil is energized;
   a valve element that is displaceable with the armature for opening and closing a flow channel;
   a tubular valve body that is provided completely inside said axially extending portion of the stator housing, which extends outwardly in the axial direction, for slidably supporting the valve element; and
   a supporting member that is directly coupled with the stator housing, wherein:
   the stator housing includes a step portion defined in the axially extending portion thereof;
   the valve body includes a flange portion that extends in a radially outward direction with respect to a longitudinal axis of the valve body at an axial end portion of the valve body;
   the flange portion is sandwiched between the step portion of the stator housing and the supporting member in said axial direction; and
   the yoke is coupled with the stator housing.

2. The solenoid valve according to claim 1, wherein:
   the stator housing is crimped to be coupled with the supporting member.

3. The solenoid valve according to claim 1, wherein:
   the supporting member is press fitted into the stator housing.

4. The solenoid valve according to claim 1, further comprising:
   a retaining ring that couples the supporting member with the stator housing.

5. The solenoid valve according to claim 1, wherein:
   the valve body is fitted into the stator housing with a clearance formed between the stator housing and the valve body.

6. The solenoid valve according to claim 1, wherein:
   a first coupling is defined between the supporting member and the stator housing;
   a second coupling is defined between the yoke and the stator housing;
   a sliding interface is defined between the valve element and the valve body; and
   the sliding interface is provided at a longitudinal position different from a longitudinal position of the first and second couplings along the longitudinal axis the valve body.

7. The solenoid valve according to claim 1, further comprising:
   a bearing that is provided in the valve body for slidably supporting the armature, wherein:
   the valve body has a first portion, on which the valve element is slidable, the first portion having a diameter of D1;
   the valve body has a second portion, on which the bearing is mounted, the second portion having a diameter of D2; and
   D1≦D2.

8. The solenoid valve according to claim 1, wherein:
   a coupling is defined between the supporting member and the stator housing;
   a sliding interface is defined between the valve element and the valve body; and
   the sliding interface is provided at a longitudinal position different from a longitudinal position of the coupling portion along the longitudinal axis the valve body.

9. The solenoid valve according to claim 1, wherein:
   a coupling is defined between the yoke and the stator housing;
   a sliding interface is defined between the valve element and the valve body; and
   the sliding interface is provided at a longitudinal position different from a longitudinal position of the coupling portion along the longitudinal axis the valve body.

10. The solenoid valve according to claim 1, wherein:
    the stator housing has a first coupling surface that faces radially inwardly with respect to a longitudinal axis of said stator housing, said first coupling surface facing said second coupling surface facing an outer surface of the supporting member;
    the stator housing has a second coupling surface that faces radially outwardly with respect to said longitudinal axis of said stator housing, said second coupling surface facing an inner surface of the yoke;
    the valve element has a slide surface that slides on an inner surface of the valve body; and
    the slide surface of the valve element is formed at a longitudinal position that is different from a position of the first coupling surface of the stator housing and from a position of the second coupling surface of the stator housing along the longitudinal axis of the valve body.

11. The solenoid valve according to claim 1, wherein:
the stator housing has a coupling surface that faces radially inwardly with respect to a longitudinal axis of said stator housing, said coupling surface facing an outer surface of the supporting member;
the valve element has a slide surface that slides on an inner surface of the valve body; and
the slide surface of the valve element is formed at a longitudinal position that is different from a position of the coupling surface of the stator housing along the longitudinal axis of the valve body.

12. The solenoid valve according to claim 1, wherein:
the stator housing has a coupling surface that faces radially outwardly with respect to a longitudinal axis of said stator housing, said coupling surface facing an inner surface of the yoke;
the valve element has a slide surface that slides on an inner surface of the valve body; and
the slide surface of the valve element is formed at a longitudinal position that is different from a position of the coupling surface of the stator housing along the longitudinal axis of the valve body.

* * * * *